(12) United States Patent
Taylor et al.

(10) Patent No.: US 7,170,408 B2
(45) Date of Patent: Jan. 30, 2007

(54) SYSTEM AND METHOD FOR INFORMATION ASSIMILATION AND FUNCTIONALITY CONTROL BASED ON POSITIONING INFORMATION OBTAINED BY IMPULSE RADIO MEANS

(75) Inventors: Elise H. Taylor, Huntsville, AL (US); James S. Finn, Huntsville, AL (US)

(73) Assignee: Time Domain Corporation, Huntsville, AL (US)

( * ) Notice: Subject to any disclaimer, the term of this patent is extended or adjusted under 35 U.S.C. 154(b) by 0 days.

(21) Appl. No.: 11/151,221

(22) Filed: Jun. 14, 2005

(65) Prior Publication Data

US 2005/0254354 A1    Nov. 17, 2005

Related U.S. Application Data

(63) Continuation of application No. 09/511,991, filed on Feb. 24, 2000, now Pat. No. 6,906,625.

(51) Int. Cl.
*G08B 1/08* (2006.01)

(52) U.S. Cl. .............. 340/539.13; 340/539.1; 340/686.1

(58) Field of Classification Search ........... 340/539.1, 340/539.13, 539.15, 572.1, 572.4, 573.1, 340/573.3, 573.4, 686.1; 342/457, 458, 463, 342/464; 455/522
See application file for complete search history.

(56) References Cited

U.S. PATENT DOCUMENTS

| | | | |
|---|---|---|---|
| 2,716,236 A | 8/1955 | Reinish et al. | 343/13 |
| 3,068,473 A | 12/1962 | Muth | 343/112 |
| 3,213,449 A | 10/1965 | Kobayashi et al. | 343/12 |
| 3,376,504 A | 4/1968 | Chick | 324/68 |
| 3,396,393 A | 8/1968 | Wagner | 343/14 |
| 3,461,452 A | 8/1969 | Welter | 343/12 |
| 3,614,226 A | 10/1971 | Vergoz | 356/5 |
| 3,659,292 A | 4/1972 | Low et al. | 343/6.5 R |
| 3,680,121 A | 7/1972 | Anderson et al. | 343/112 TC |
| 3,687,556 A | 8/1972 | Price et al. | 356/152 |
| 3,714,573 A | 1/1973 | Grossman | 325/32 |
| 3,714,650 A | 1/1973 | Fuller et al. | 343/6.5 LC |
| 3,725,920 A | 4/1973 | Küpfer et al. | 343/6.5 R |

(Continued)

FOREIGN PATENT DOCUMENTS

DE    197 47 745 A1    7/1999

(Continued)

OTHER PUBLICATIONS

Anderson, F. et al., "Ultra-wideband beamforming in sparse arrays," *IEE Proceedings-H*, vol. 138, No. 4, Aug. 1991, 8 pages.

(Continued)

*Primary Examiner*—Van T. Trieu
(74) *Attorney, Agent, or Firm*—Venable LLP; Robert S. Babayi

(57) ABSTRACT

A system and method for information assimilation and functionality control based on positioning information obtained by impulse radio techniques, which utilizes the position information and communication abilities inherent in impulse radio technology to correlate position information of an entrant into a predetermined area with information about the entrant to accomplish a multitude of functionalities and assimilate information.

20 Claims, 14 Drawing Sheets

U.S. PATENT DOCUMENTS

| | | | |
|---|---|---|---|
| 3,757,290 A | 9/1973 | Ross et al. | 340/23 |
| 3,789,410 A | 1/1974 | Smith et al. | 343/112 D |
| 3,829,674 A | 8/1974 | Joseph | 702/151 |
| 3,886,553 A | 5/1975 | Bates | 343/112 R |
| 3,953,856 A | 4/1976 | Hammack | 343/112 D |
| 4,083,049 A | 4/1978 | Mattern et al. | 343/7.7 |
| 4,114,155 A | 9/1978 | Raab | 343/105 R |
| 4,161,730 A | 7/1979 | Anderson | 343/6.5 R |
| 4,283,726 A | 8/1981 | Spence et al. | 343/112 D |
| 4,315,260 A | 2/1982 | Küpfer | 343/7.5 |
| 4,543,580 A | 9/1985 | Bent et al. | 343/460 |
| 4,596,023 A | 6/1986 | Driver et al. | 375/55 |
| 4,622,540 A | 11/1986 | Guscott et al. | 340/531 |
| 4,641,317 A | 2/1987 | Fullerton | 375/1 |
| 4,704,574 A | 11/1987 | Nossen | 324/83 D |
| 4,727,593 A | 2/1988 | Goldstein | 455/605 |
| 4,728,959 A | 3/1988 | Maloney et al. | 342/457 |
| 4,743,906 A | 5/1988 | Fullerton | 342/27 |
| 4,813,057 A | 3/1989 | Fullerton | 375/37 |
| 4,907,001 A | 3/1990 | Harmuth | 342/159 |
| 4,916,429 A | 4/1990 | Hicks et al. | 340/436 |
| 4,916,455 A | 4/1990 | Bent et al. | 342/457 |
| 4,979,186 A | 12/1990 | Fullerton | 375/23 |
| 5,057,846 A | 10/1991 | Harmuth | 342/204 |
| 5,127,042 A | 6/1992 | Gillig et al. | 379/59 |
| 5,134,408 A | 7/1992 | Harmuth | 342/21 |
| 5,148,174 A | 9/1992 | Harmuth | 342/21 |
| 5,216,429 A | 6/1993 | Nakagawa et al. | 342/45 |
| 5,265,121 A | 11/1993 | Stewart | 375/99 |
| 5,317,323 A | 5/1994 | Kennedy et al. | 342/457 |
| 5,361,070 A | 11/1994 | McEwan | 342/21 |
| 5,363,108 A | 11/1994 | Fullerton | 342/27 |
| 5,457,394 A | 10/1995 | McEwan | 324/642 |
| 5,465,094 A | 11/1995 | McEwan | 342/28 |
| 5,497,160 A | 3/1996 | Koehler et al. | 342/145 |
| 5,499,029 A | 3/1996 | Bashforth et al. | 342/22 |
| 5,510,800 A | 4/1996 | McEwan | 342/387 |
| 5,512,834 A | 4/1996 | McEwan | 324/642 |
| 5,519,400 A | 5/1996 | McEwan | 342/28 |
| 5,521,600 A | 5/1996 | McEwan | 342/27 |
| 5,573,012 A | 11/1996 | McEwan | 128/782 |
| 5,576,627 A | 11/1996 | McEwan | 324/639 |
| 5,589,838 A | 12/1996 | McEwan | 342/387 |
| 5,661,490 A | 8/1997 | McEwan | 342/387 |
| 5,677,927 A | 10/1997 | Fullerton et al. | 375/200 |
| 5,687,169 A | 11/1997 | Fullerton | 370/324 |
| 5,748,891 A | 5/1998 | Fleming et al. | 375/150 |
| 5,757,320 A | 5/1998 | McEwan | 342/387 |
| 5,764,696 A | 6/1998 | Barnes et al. | 375/239 |
| 5,766,208 A | 6/1998 | McEwan | 600/595 |
| 5,767,790 A | 6/1998 | Jovellana | 340/870.02 |
| 5,767,953 A | 6/1998 | McEwan | 356/5.01 |
| 5,774,091 A | 6/1998 | McEwan | 342/387 |
| 5,809,424 A | 9/1998 | Eizenhoefer | 455/456 |
| 5,812,081 A | 9/1998 | Fullerton | 342/21 |
| 5,832,035 A | 11/1998 | Fullerton | 375/210 |
| 5,859,612 A | 1/1999 | Gilhousen | 342/457 |
| 5,901,172 A * | 5/1999 | Fontana et al. | 375/130 |
| 5,901,633 A | 5/1999 | Chan et al. | 92/5 R |
| 5,912,644 A | 6/1999 | Wang | 342/457 |
| 5,917,433 A | 6/1999 | Keillor et al. | 340/989 |
| 5,920,278 A | 7/1999 | Tyler et al. | 342/33 |
| 5,952,956 A | 9/1999 | Fullerton | 342/27 |
| 5,959,580 A | 9/1999 | Maloney et al. | 342/457 |
| 5,960,031 A | 9/1999 | Fullerton et al. | 375/200 |
| 5,963,581 A | 10/1999 | Fullerton et al. | 375/200 |
| 5,969,663 A | 10/1999 | Fullerton et al. | 342/27 |
| 5,977,778 A | 11/1999 | Chan et al. | 324/635 |
| 5,995,534 A | 11/1999 | Fullerton et al. | 375/200 |
| 6,005,395 A | 12/1999 | Chan et al. | 324/635 |
| 6,026,125 A | 2/2000 | Larrick, Jr. et al. | 375/295 |
| 6,031,862 A | 2/2000 | Fullerton et al. | 375/200 |
| 6,040,898 A | 3/2000 | Mrosik et al. | 356/5.09 |
| 6,054,950 A * | 4/2000 | Fontana | 342/463 |
| 6,111,536 A | 8/2000 | Richards et al. | 342/125 |
| 6,122,602 A | 9/2000 | Michalski et al. | 702/159 |
| 6,133,876 A | 10/2000 | Fullerton et al. | 342/375 |
| 6,142,059 A | 11/2000 | Chan et al. | 92/5 R |

FOREIGN PATENT DOCUMENTS

| | | |
|---|---|---|
| DE | 197 55 237 A1 | 7/1999 |
| EP | 0 676 650 A2 | 10/1995 |
| WO | WO 91/13370 | 9/1991 |
| WO | WO 96/41432 | 12/1996 |
| WO | WO 98/45728 A1 | 10/1998 |
| WO | WO 99/49333 | 9/1999 |

OTHER PUBLICATIONS

Skolnik, M.I., *Introduction to Radar Systems*, McGraw-Hill, 1980, pp. 553-560.

English-language Abstract and Patent Family Information for DE 19755237, as downloaded from Derwent Database, 2 pages.

Written Opinion from PCT Application No. PCT/US01/04405, 6 pages (mailed Nov. 27, 2001).

* cited by examiner

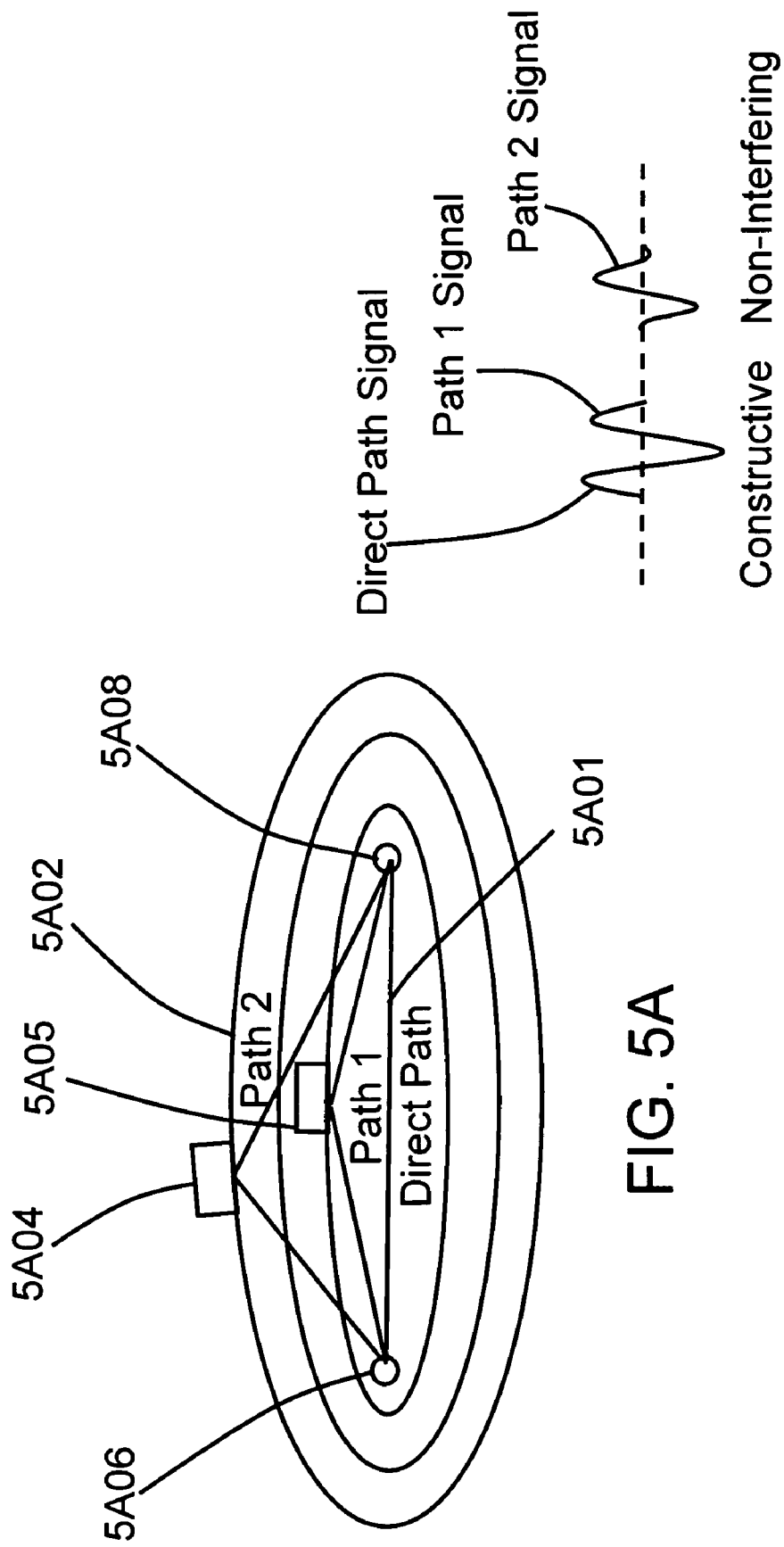

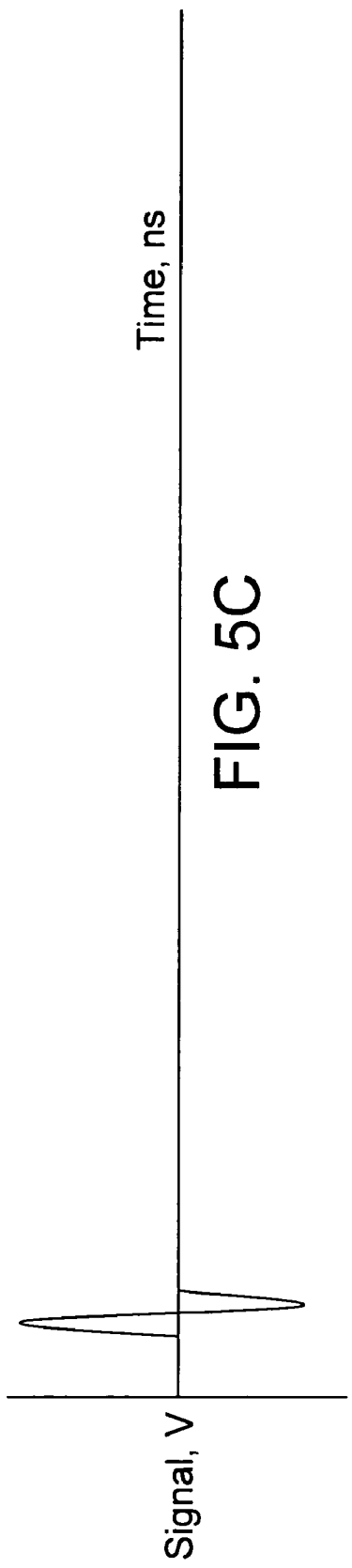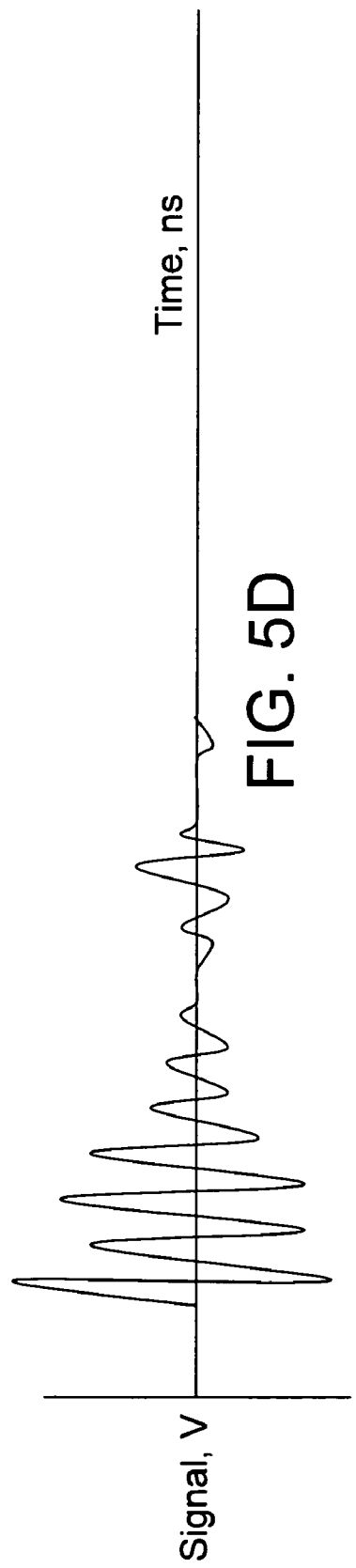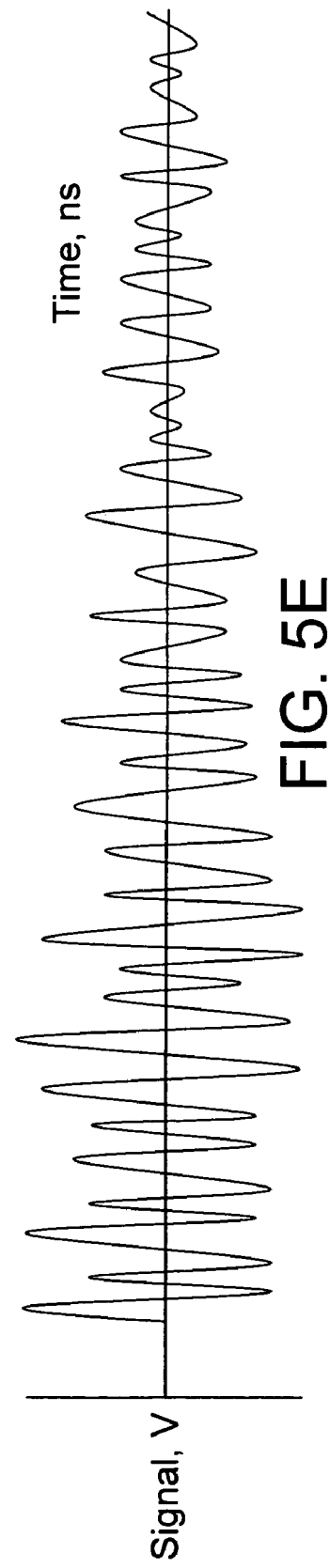

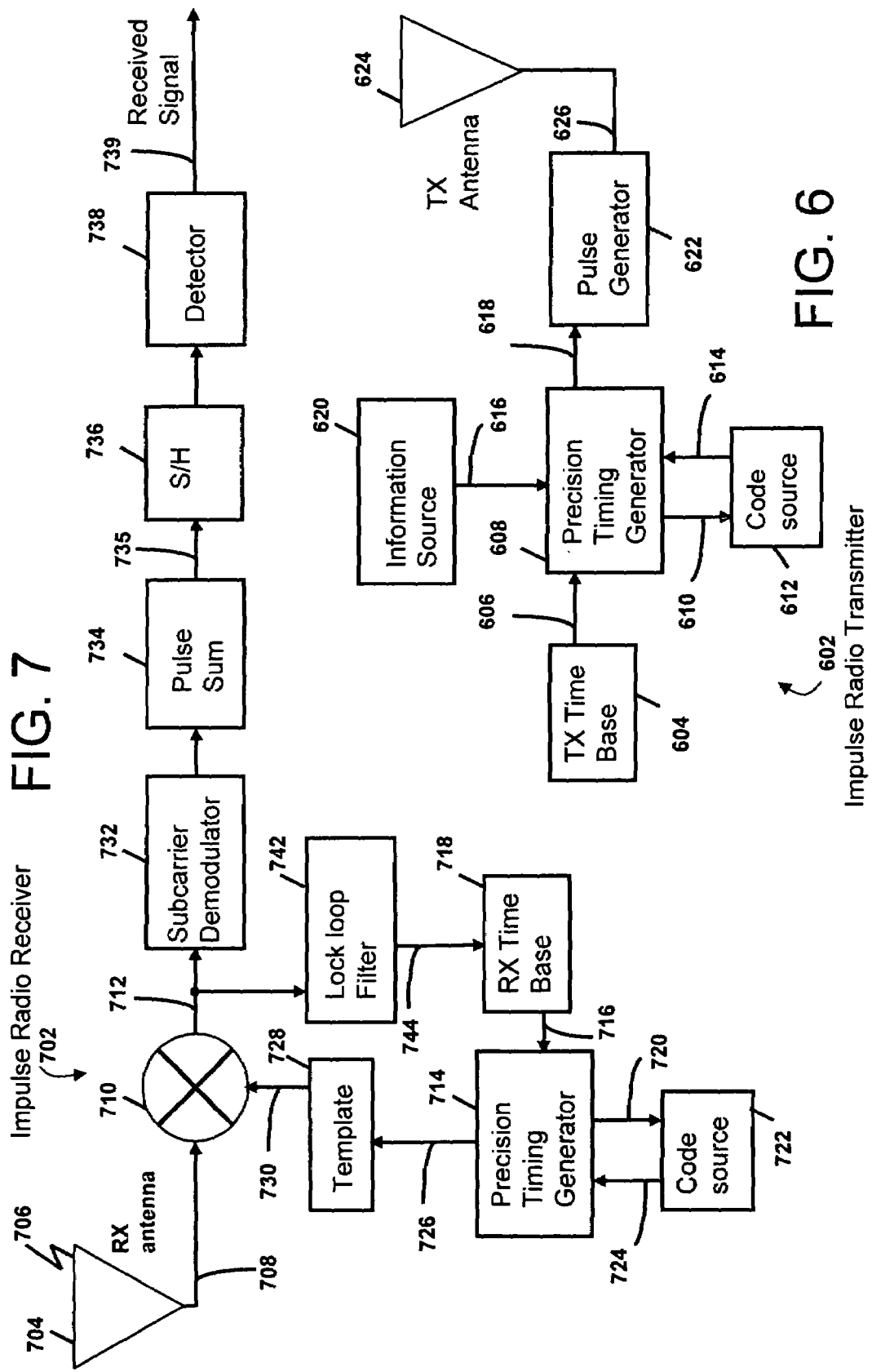

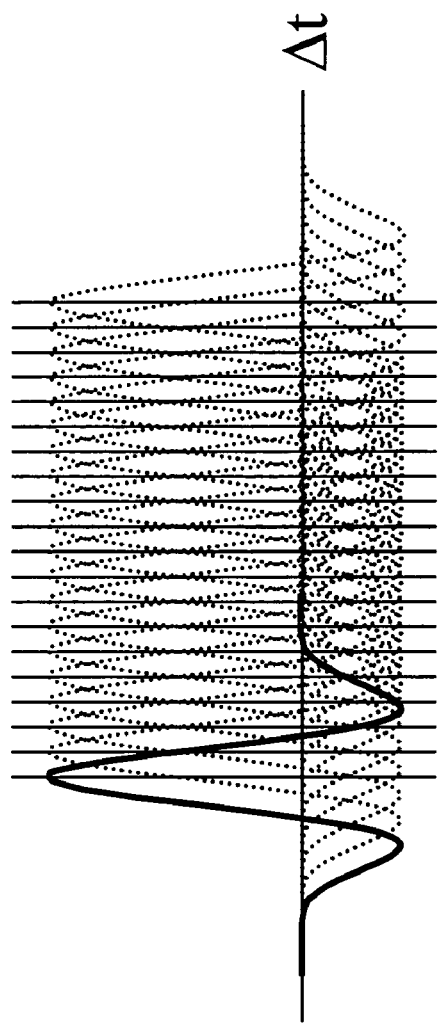
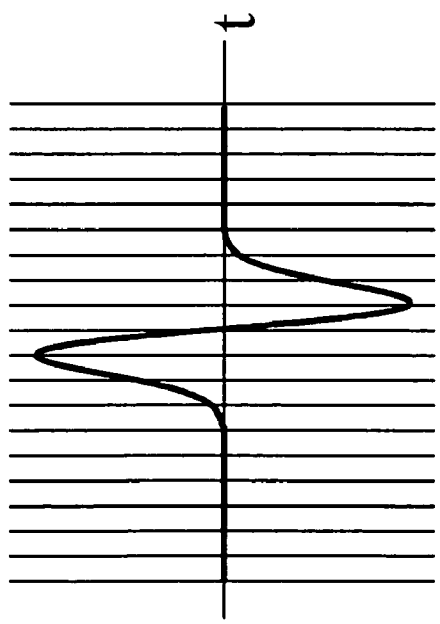
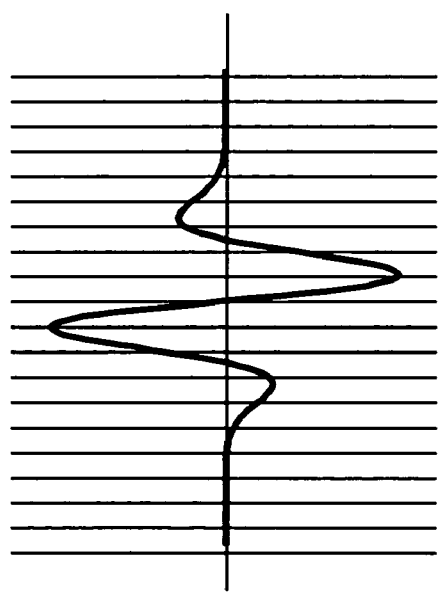
FIG. 8A
FIG. 8B
FIG. 8C

Four nodes in an Impulse Radio TDMA linked network

SYSTEM AND METHOD FOR INFORMATION ASSIMILATION AND FUNCTIONALITY CONTROL BASED ON POSITIONING INFORMATION OBTAINED BY IMPULSE RADIO MEANS

CROSS-REFERENCE TO RELATED APPLICATIONS

This application is a continuation of U.S. patent application Ser. No. 09/511,991, filed on Feb. 24, 2000, now U.S. Pat. No. 6,906,625 (issued Jun. 14, 2005), which is herein incorporated by reference.

The following U.S. Patent Applications are incorporated herein by reference in their entirety: Ser. No. 09/456,410, filed Dec. 8, 1999, now U.S. Pat. No. 6,492,904 (issued Dec. 10, 2002) and its parent Ser. No. 09/407,106, filed Sep. 27, 1999, now U.S. Pat. No. 6,512,455 (issued Jan. 28, 2003), both titled, "System and Method for Monitoring Assets, Objects, People and Animals Utilizing Impulse Radio"; Ser. No. 09/332,502, filed on Jun. 14, 1999, now U.S. Pat. No. 6,177,903 (issued Jan. 23, 2001) and titled "System and Method for Intrusion Detection Using a Time Domain Radar Array"; Ser. No. 09/332,503, filed on Jun. 14, 1999, now U.S. Pat. No. 6,218,979 (issued Apr. 17, 2001) and titled "Wide Area Time Domain Radar Array"; Ser. No. 09/045,929, filed Mar. 23, 1998, now U.S. Pat. No. 6,133,876 (issued Oct. 2, 2001) and titled "Ultrawide-Band Position Determination System and Method"; Ser. No. 09/083,993, filed May 26, 1998, now U.S. Pat. No. 6,111,536 (issued Aug. 29, 2000) and titled "System and Method for Distance Measurement by Inphase and Quadrature Signals in a Radio System"; and Ser. No. 09/146,524, filed Sep. 3, 1998, now U.S. Pat. No. 6,304,623 (issued Oct. 16, 2001) and titled "Precision Timing Generator System and Method."

BACKGROUND OF THE INVENTION

1. Field of the Invention

The present invention relates generally to positioning systems and methods and information assimilation. More particularly, the present invention provides person or object positioning utilizing impulse radio techninques.

2. Background of the Invention and Related Art

In a number of situations it would be very advantages to have the ability to ascertain the exact position of an object or person in a predetermined area. This information can be used in a variety of ways and in a number of circumstances. It would be further advantageous to have the ability to correlate information obtained from the object or person with the movements of that object or person in the predetermined area.

With the development of impulse radio, precise positioning capabilities have been enabled. In co-pending and commonly owned application Ser. No. 09/456,410, filed Dec. 8, 1999, titled, "System and Method for Monitoring Assets, Objects, People and Animals Utilizing Impulse Radio," and it's parent Ser. No. 09/407,106, filed Sep. 27, 1999, both of which are incorporated herein by reference, precise positioning was described in a number of scenarios. Although in the aforementioned applications positioning was described in detail, a way to correlate that position information to information relating the object or person whose movement is being tracked can be improved upon. Further, the ability to utilize the position information to accomplish a number of functionalities based on that position information should be realized.

For example, in a theme park environment determining the position of a customer as disclosed in the aforementioned application, which is incorporated herein by reference, is important information. However, what is done with that information is equally important. The marketing people would like to know many factors which can be determined by knowing the position of its customers and correlating information about the customers: 1) what is the average age of the people attending a given performance; 2) what is the average age of people who like to go on certain rides; 3) do males or females prefer to watch the water skiing show; 4) what is the position of all people in the park over 70 years old; 5) what is the position of all children under the age of 5, are they in a adult area or on a ride that requires to age to be over 10. This list is meant to be only illustrative and not inclusive of the information that is desirable to be ascertained.

In addition to information that can be gathered, it would be beneficial if the position information could be used to provide functionalities based on the position information. For example, again in the Disney Land paradigm, it would be extremely beneficial if when a customer was within a given range of a certain display, a narrative of the display would begin playing; and in a language that matched the primary language of the customer. Or it would be very beneficial if when it was determined that a child below a certain age was outside of a given range from their parent, that an alerting means would notify not only the parents, but the theme park as well.

Therefore, there is a strong need for a system and method to utilize the accurate position information that can be obtained from impulse radio positioning techniques, and utilize said position information to implement functionalities based on that position information and to correlate information relating to the object or person whose movement is being tracked to its position information.

SUMMARY OF THE INVENTION

The present invention utilizes the position information and communication abilities inherent in impulse radio technology to correlate position information of an entrant into a predetermined area, with specific or personal information about said entrant to accomplish a multitude of functionalities and assimilate a wealth of information.

It is therefore an object of the present invention to provide a position locating system and method utilizing impulse radio techniques.

It is another object of the present invention to provide a position locating system and method utilizing impulse radio that can correlate information ascertained about an entrant, such as an object or a person, being positioned with the position information.

It is another object of the present invention to provide a position locating system and method utilizing impulse radio and utilize said position information to implement functionalities based on that position information.

These and other objects are provided, according to the present invention, by obtaining information relating to an object or person that will be located in a predetermined area, determining at least one position of said object within said predetermined area using impulse radio means, and correlating information about said object to said at least one position of said object or person within said predetermined area. Further, these and other objects are provided, according to the present invention, by using said correlated information to said object or person with its position information and interfacing said information with some functionality.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 5A illustrates a typical geometrical configuration giving rise to multipath received signals;

FIG. 5B illustrates exemplary multipath signals in the time domain;

FIGS. 5C–5E illustrate a signal plot of various multipath environments.

FIG. 6 illustrates a representative impulse radio transmitter functional diagram;

FIG. 7 illustrates a representative impulse radio receiver functional diagram;

FIG. 8A illustrates a representative received pulse signal at the input to the correlator;

FIG. 8B illustrates a sequence of representative impulse signals in the correlation process;

FIG. 8C illustrates the potential locus of results as a function of the various potential template time positions;

DETAILED DESCRIPTION OF THE EMBODIMENTS

Overview of the Invention

Figure 1:
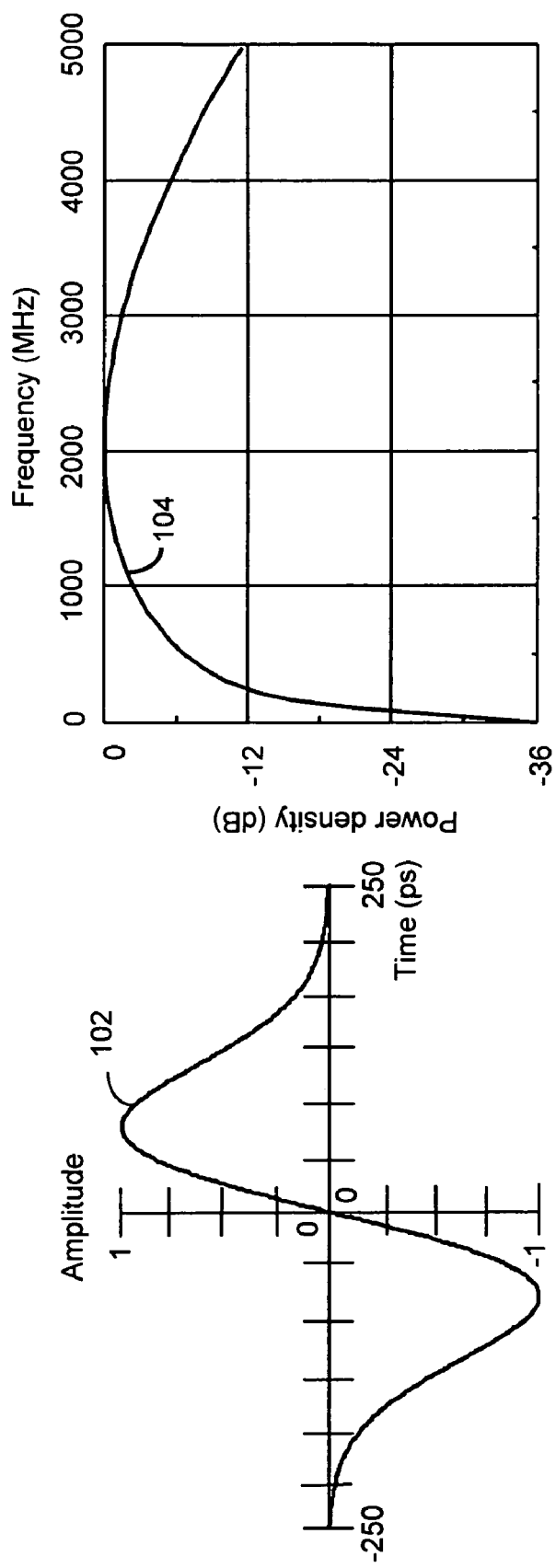
FIG. 1A illustrates a representative Gaussian Monocycle waveform in the time domain.
FIG. 1B illustrates the frequency domain amplitude of the Gaussian Monocycle of FIG. 1A.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art. Like numbers refer to like elements throughout.

Recent advances in communications technology have enabled an emerging, revolutionary ultra wideband technology (UWB) called impulse radio communications systems (hereinafter called impulse radio). To better understand the benefits of impulse radio to the present invention, the following review of impulse radio follows Impulse radio was first fully described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of impulse radio patents include U.S. Pat. No. 5,677,927 (issued Oct. 14, 1997), U.S. Pat. No. 5,687,169 (issued Nov. 11, 1997) and U.S. Pat. No. 5,832,035 (issued Nov. 3, 1998) to Fullerton et al.

Uses of impulse radio systems are described in U.S. patent application Ser. No. 09/332,502, entitled, "System and Method for Intrusion Detection Using a Time Domain Radar Array," and U.S. patent application Ser. No. 09/332,503, entitled, "Wide Area Time Domain Radar Array," both filed on Jun. 14, 1999 and both of which are assigned to the assignee of the present invention. These patent documents are incorporated herein by reference.

Impulse Radio Basics

This section is directed to technology basics and provides the reader with an introduction to impulse radio concepts, as well as other relevant aspects of communications theory. This section includes subsections relating to waveforms, pulse trains, coding for energy smoothing and channelization, modulation, reception and demodulation, interference resistance, processing gain, capacity, multipath and propagation, distance measurement, and qualitative and quantitative characteristics of these concepts. It should be understood that this section is provided to assist the reader with understanding the present invention, and should not be used to limit the scope of the present invention.

Impulse radio refers to a radio system based on short, low duty cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Most waveforms with enough bandwidth approximate a Gaussian shape to a useful degree.

Impulse radio can use many types of modulation, including AM, time shift (also referred to as pulse position) and M-ary versions. The time shift method has simplicity and power output advantages that make it desirable. In this document, the time shift method is used as an illustrative example.

In impulse radio communications, the pulse-to-pulse interval can be varied on a pulse-by-pulse basis by two components: an information component and a pseudo-random code component. Generally, conventional spread spectrum systems make use of pseudo-random codes to spread the normally narrow band information signal over a relatively wide band of frequencies. A conventional spread spectrum receiver correlates these signals to retrieve the original information signal. Unlike conventional spread spectrum systems, the pseudo-random code for impulse radio communications is not necessary for energy spreading because the monocycle pulses themselves have an inherently wide bandwidth. Instead, the pseudo-random code is used for channelization, energy smoothing in the frequency domain, resistance to interference, and reducing the interference potential to nearby receivers.

The impulse radio receiver is typically a direct conversion receiver with a cross correlator front end in which the front end coherently converts an electromagnetic pulse train of monocycle pulses to a baseband signal in a single stage. The baseband signal is the basic information signal for the impulse radio communications system. It is often found desirable to include a subcarrier with the baseband signal to help reduce the effects of amplifier drift and low frequency noise. The subcarrier that is typically implemented alternately reverses modulation according to a known pattern at a rate faster than the data rate. This same pattern is used to reverse the process and restore the original data pattern just before detection. This method permits alternating current (AC) coupling of stages, or equivalent signal processing to eliminate direct current (DC) drift and errors from the detection process. This method is described in detail in U.S. Pat. No. 5,677,927 to Fullerton et al.

In impulse radio communications utilizing time shift modulation, each data bit typically time position modulates many pulses of the periodic timing signal. This yields a modulated, coded timing signal that comprises a train of identically shaped pulses for each single data bit. The impulse radio receiver integrates multiple pulses to recover the transmitted information.

Waveforms

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst off time attenuation.

For system analysis purposes, it is convenient to model the desired waveform in an ideal sense to provide insight into the optimum behavior for detail design guidance. One such waveform model that has been useful is the Gaussian monocycle as shown in FIG. 1A. This waveform is representative of the transmitted pulse produced by a step function into an ultra-wideband antenna. The basic equation normalized to a peak value of 1 is as follows:

$$f_{mono}(t) = \sqrt{e}\left(\frac{t}{\sigma}\right)e^{\frac{-t^2}{2\sigma^2}}$$

Where,

σ is a time scaling parameter, t is time, $f_{mono}(t)$ is the waveform voltage, and e is the natural logarithm base.

The frequency domain spectrum of the above waveform is shown in FIG. 1B. The corresponding equation is:

$$F_{mono}(f) = (2\pi)^{3/2}\sigma f e^{-2(\pi\sigma f)^2}$$

The center frequency ($f_c$), or frequency of peak spectral density is:

$$f_c = \frac{1}{2\pi\sigma}$$

These pulses, or bursts of cycles, may be produced by methods described in the patents referenced above or by other methods that are known to one of ordinary skill in the art. Any practical implementation will deviate from the ideal mathematical model by some amount. In fact, this deviation from ideal may be substantial and yet yield a system with acceptable performance. This is especially true for microwave implementations, where precise waveform shaping is difficult to achieve. These mathematical models are provided as an aid to describing ideal operation and are not intended to limit the invention. In fact, any burst of cycles that adequately fills a given bandwidth and has an adequate on-off attenuation ratio for a given application will serve the purpose of this invention.

A Pulse Train

Impulse radio systems can deliver one or more data bits per pulse; however, impulse radio systems more typically use pulse trains, not single pulses, for each data bit. As described in detail in the following example system, the impulse radio transmitter produces and outputs a train of pulses for each bit of information.

Figure 2:
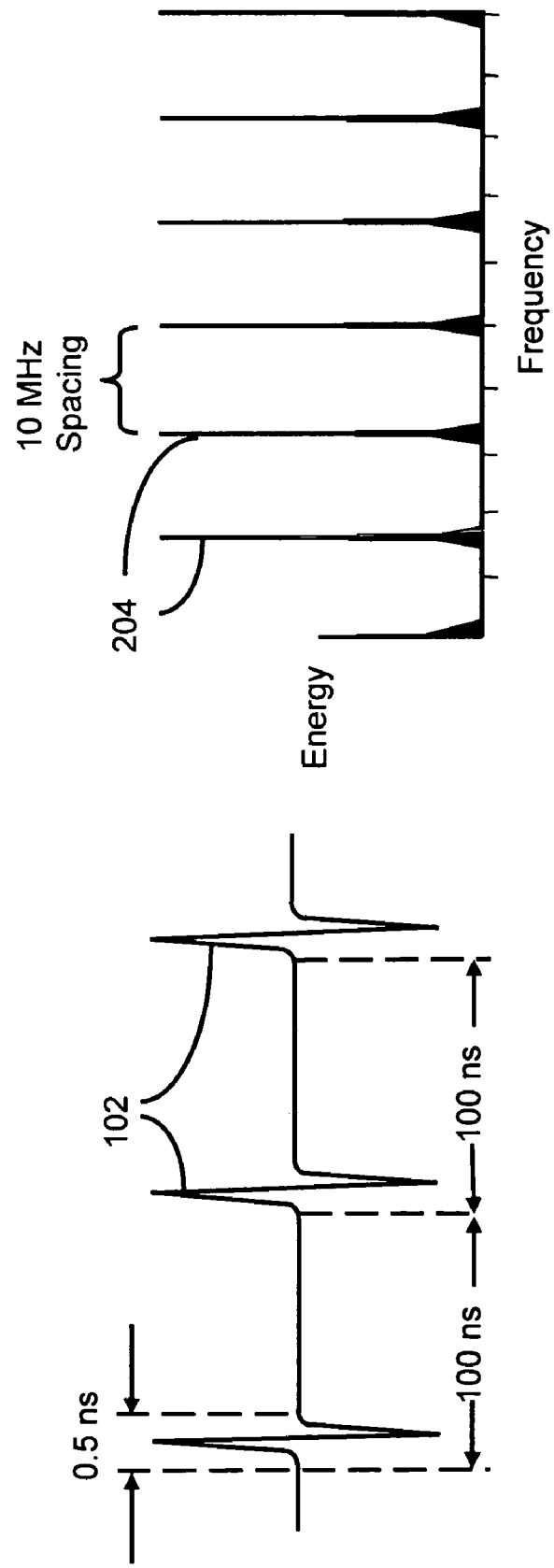
FIG. 2A illustrates a pulse train comprising pulses as in FIG. 1A.
FIG. 2B illustrates the frequency domain amplitude of the waveform of FIG. 2A.

Prototypes built by the inventors have pulse repetition frequencies including 0.7 and 10 megapulses per second (Mpps, where each megapulse is $10^6$ pulses). FIGS. 2A and 2B are illustrations of the output of a typical 10 Mpps system with uncoded, unmodulated, 0.5 nanosecond (ns) pulses 102. FIG. 2A shows a time domain representation of this sequence of pulses 102. FIG. 2B, which shows 60 MHZ at the center of the spectrum for the waveform of FIG. 2A, illustrates that the result of the pulse train in the frequency domain is to produce a spectrum comprising a set of lines 204 spaced at the frequency of the 10 Mpps pulse repetition rate. When the full spectrum is shown, the envelope of the line spectrum follows the curve of the single pulse spectrum 104 of FIG. 1B. For this simple uncoded case, the power of the pulse train is spread among roughly two hundred comb lines. Each comb line thus has a small fraction of the total power and presents much less of an interference problem to receiver sharing the band.

It can also be observed from FIG. 2A that impulse radio systems typically have very low average duty cycles resulting in average power significantly lower than peak power. The duty cycle of the signal in the present example is 0.5%, based on a 0.5 ns pulse in a 100 ns interval.

Coding for Energy Smoothing and Channelization

For high pulse rate systems, it may be necessary to more finely spread the spectrum than is achieved by producing comb lines. This may be done by pseudo-randomly positioning each pulse relative to its nominal position.

Figure 3:
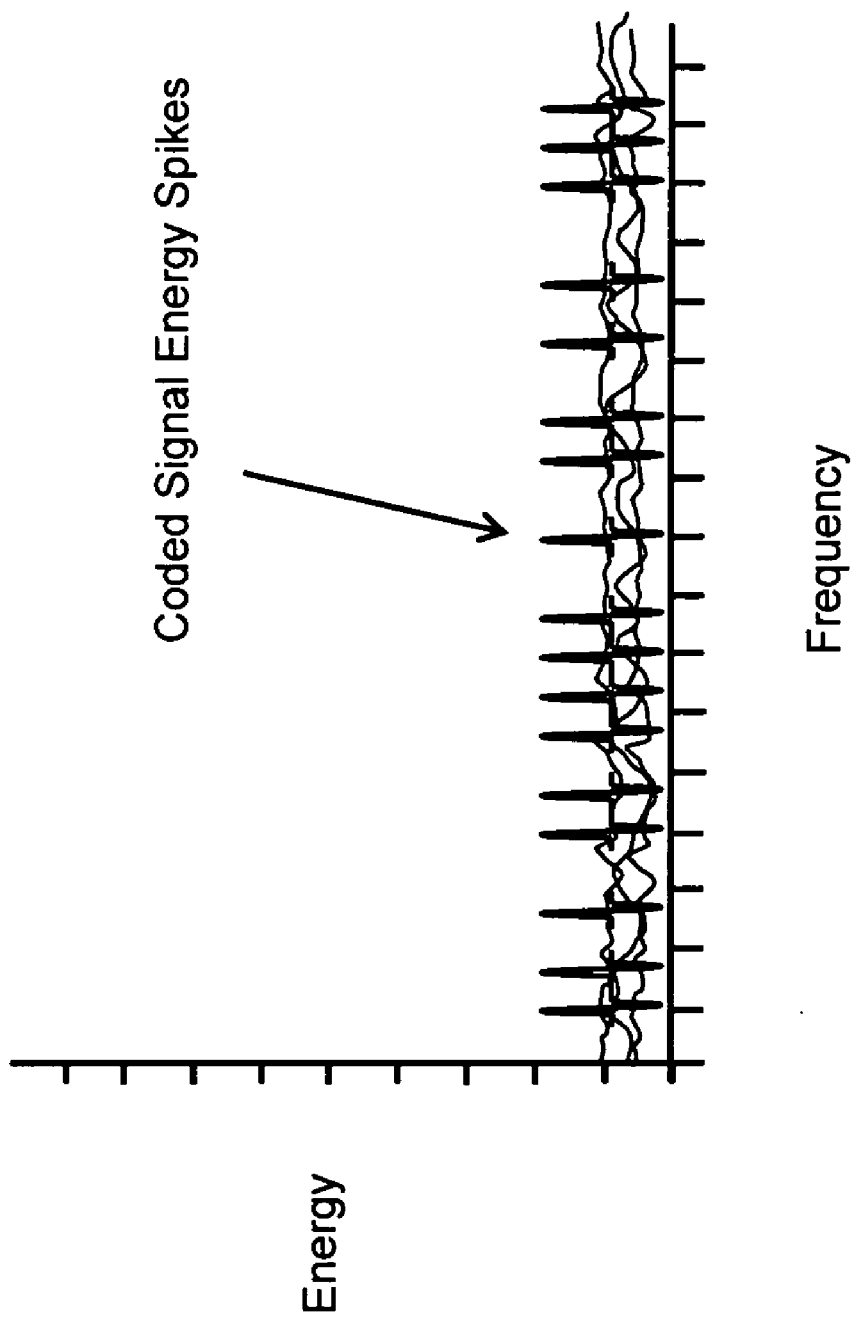
FIG. 3 illustrates the frequency domain amplitude of a sequence of time coded pulses.

FIG. 3 is a plot illustrating the impact of a pseudo-noise (PN) code dither on energy distribution in the frequency domain (A pseudo-noise, or PN code is a set of time positions defining the pseudo-random positioning for each pulse in a sequence of pulses). FIG. 3, when compared to FIG. 2B, shows that the impact of using a PN code is to destroy the comb line structure and spread the energy more uniformly. This structure typically has slight variations which are characteristic of the specific code used.

The PN code also provides a method of establishing independent communication channels using impulse radio.

PN codes can be designed to have low cross correlation such that a pulse train using one code will seldom collide on more than one or two pulse positions with a pulses train using another code during any one data bit time. Since a data bit may comprise hundreds of pulses, this represents a substantial attenuation of the unwanted channel.

Modulation

Any aspect of the waveform can be modulated to convey information. Amplitude modulation, phase modulation, frequency modulation, time shift modulation and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount (that is, in addition to PN code dither) in response to the information signal. This amount is typically very small relative to the PN code shift. In a 10 Mpps system with a center frequency of 2 GHz., for example, the PN code may command pulse position variations over a range of 100 ns; whereas, the information modulation may only deviate the pulse position by 150 ps.

Thus, in a pulse train of n pulses, each pulse is delayed a different amount from its respective time base clock position by an individual code delay amount plus a modulation amount, where n is the number of pulses associated with a given data symbol digital bit.

Modulation further smoothes the spectrum, minimizing structure in the resulting spectrum.

Reception and Demodulation

Clearly, if there were a large number of impulse radio users within a confined area, there might be mutual interference. Further, while the PN coding minimizes that interference, as the number of users rises, the probability of an individual pulse from one user's sequence being received simultaneously with a pulse from another user's sequence increases. Impulse radios are able to perform in these environments, in part, because they do not depend on receiving every pulse. The impulse radio receiver performs a correlating, synchronous receiving function (at the RF level) that uses a statistical sampling and combining of many pulses to recover the transmitted information.

Impulse radio receivers typically integrate from 1 to 1000 or more pulses to yield the demodulated output. The optimal number of pulses over which the receiver integrates is dependent on a number of variables, including pulse rate, bit rate, interference levels, and range.

Interference Resistance

Besides channelization and energy smoothing, the PN coding also makes impulse radios highly resistant to interference from all radio communications systems, including other impulse radio transmitters. This is critical as any other signals within the band occupied by an impulse signal potentially interfere with the impulse radio. Since there are currently no unallocated bands available for impulse systems, they must share spectrum with other conventional radio systems without being adversely affected. The PN code helps impulse systems discriminate between the intended impulse transmission and interfering transmissions from others.

Figure 4:
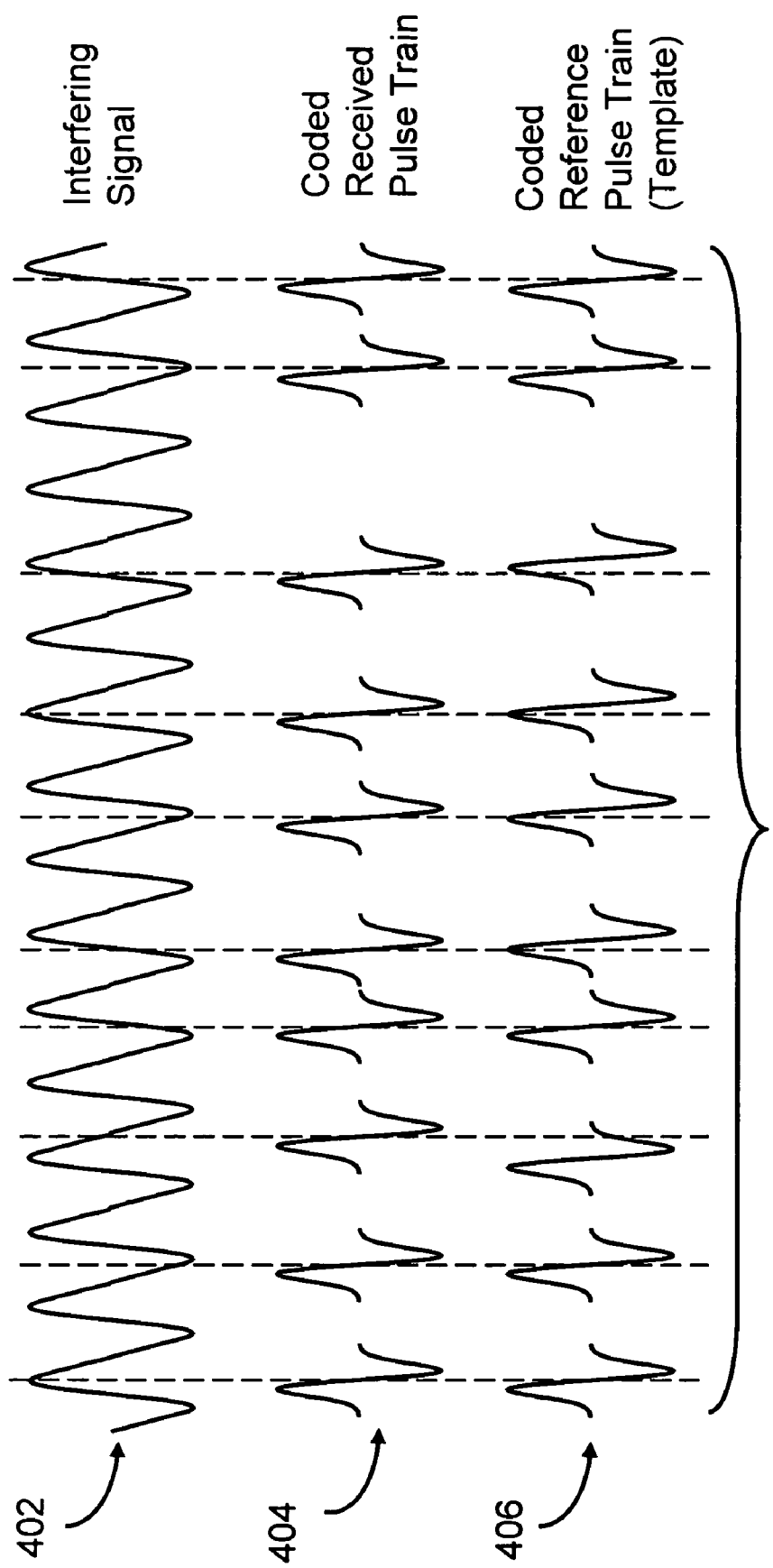
FIG. 4 illustrates a typical received signal and interference signal.

FIG. 4 illustrates the result of a narrow band sinusoidal interference signal 402 overlaying an impulse radio signal 404. At the impulse radio receiver, the input to the cross correlation would include the narrow band signal 402, as well as the received ultrawide-band impulse radio signal 404. The input is sampled by the cross correlator with a PN dithered template signal 406. Without PN coding, the cross correlation would sample the interfering signal 402 with such regularity that the interfering signals could cause significant interference to the impulse radio receiver. However, when the transmitted impulse signal is encoded with the PN code dither (and the impulse radio receiver template signal 406 is synchronized with that identical PN code dither) the correlation samples the interfering signals pseudo-randomly. The samples from the interfering signal add incoherently, increasing roughly according to square root of the number of samples integrated; whereas, the impulse radio samples add coherently, increasing directly according to the number of samples integrated. Thus, integrating over many pulses overcomes the impact of interference.

Processing Gain

Impulse radio is resistant to interference because of its large processing gain. For typical spread spectrum systems, the definition of processing gain, which quantifies the decrease in channel interference when wide-band communications are used, is the ratio of the bandwidth of the channel to the bit rate of the information signal. For example, a direct sequence spread spectrum system with a 10 kHz information bandwidth and a 10 MHZ channel bandwidth yields a processing gain of 1000 or 30 dB. However, far greater processing gains are achieved with impulse radio systems, where for the same 10 KHz information bandwidth is spread across a much greater 2 GHz. channel bandwidth, the theoretical processing gain is 200,000 or 53 dB.

Capacity

It has been shown theoretically, using signal to noise arguments, that thousands of simultaneous voice channels are available to an impulse radio system as a result of the exceptional processing gain, which is due to the exceptionally wide spreading bandwidth.

For a simplistic user distribution, with N interfering users of equal power equidistant from the receiver, the total interference signal to noise ratio as a result of these other users can be described by the following equation:

$$V_{tot}^2 = \frac{N\sigma^2}{\sqrt{Z}}$$

Where $V^2_{tot}$ is the total interference signal to noise ratio variance, at the receiver;

N is the number of interfering users;

$\sigma^2$ is the signal to noise ratio variance resulting from one of the interfering signals with a single pulse cross correlation; and Z is the number of pulses over which the receiver integrates to recover the modulation.

This relationship suggests that link quality degrades gradually as the number of simultaneous users increases. It also shows the advantage of integration gain. The number of users that can be supported at the same interference level increases by the square root of the number of pulses integrated.

Multipath and Propagation

One of the striking advantages of impulse radio is its resistance to multipath fading effects. Conventional narrow band systems are subject to multipath through the Rayleigh fading process, where the signals from many delayed reflections combine at the receiver antenna according to their seemingly random relative phases. This results in possible summation or possible cancellation, depending on the specific propagation to a given location. This situation occurs where the direct path signal is weak relative to the multipath signals, which represents a major portion of the potential coverage of a radio system. In mobile systems, this results in wild signal strength fluctuations as a function of distance traveled, where the changing mix of multipath signals results in signal strength fluctuations for every few feet of travel.

Impulse radios, however, can be substantially resistant to these effects. Impulses arriving from delayed multipath reflections typically arrive outside of the correlation time and thus can be ignored. This process is described in detail with reference to FIGS. 5A and 5B. In FIG. 5A, three propagation paths are shown. The direct path representing the straight line distance between the transmitter and receiver is the shortest. Path 1 represents a grazing multipath reflection, which is very close to the direct path. Path 2 represents a distant multipath reflection. Also shown are elliptical (or, in space, ellipsoidal) traces that represent other possible locations for reflections with the same time delay.

FIG. 5B represents a time domain plot of the received waveform from this multipath propagation configuration. This figure comprises three doublet pulses as shown in FIG. 1A. The direct path signal is the reference signal and represents the shortest propagation time. The path 1 signal is delayed slightly and actually overlaps and enhances the signal strength at this delay value. Note that the reflected waves are reversed in polarity. The path 2 signal is delayed sufficiently that the waveform is completely separated from the direct path signal. If the correlator template signal is positioned at the direct path signal, the path 2 signal will produce no response. It can be seen that only the multipath signals resulting from very close reflectors have any effect on the reception of the direct path signal. The multipath signals delayed less than one quarter wave (one quarter wave is about 1.5 inches, or 3.5 cm at 2 GHz center frequency) are the only multipath signals that can attenuate the direct path signal. This region is equivalent to the first Fresnel zone familiar to narrow band systems designers. Impulse radio, however, has no further nulls in the higher Fresnel zones. The ability to avoid the highly variable attenuation from multipath gives impulse radio significant performance advantages.

FIG. 5A illustrates a typical multipath situation, such as in a building, where there are many reflectors 5A04, 5A05 and multiple propagation paths 5A02, 5A01. In this figure, a transmitter TX 5A06 transmits a signal which propagates along the multiple propagation paths 5A02, 5A04 to receiver RX 5A08, where the multiple reflected signals are combined at the antenna.

FIG. 5B illustrates a resulting typical received composite pulse waveform resulting from the multiple reflections and multiple propagation paths 5A01, 5A02. In this figure, the direct path signal 5A01 is shown as the first pulse signal received. The multiple reflected signals ("multipath signals", or "multipath") comprise the remaining response as illustrated.

FIGS. 5C, 5D, and 5E represent the received signal from a TM-UWB transmitter in three different multipath environments. These figures are not actual signal plots, but are hand drawn plots approximating typical signal plots. FIG. 5C illustrates the received signal in a very low multipath environment. This may occur in a building where the receiver antenna is in the middle of a room and is one meter from the transmitter. This may also represent signals received from some distance, such as 100 meters, in an open field where there are no objects to produce reflections. In this situation, the predominant pulse is the first received pulse and the multipath reflections are too weak to be significant. FIG. 5D illustrates an intermediate multipath environment. This approximates the response from one room to the next in a building. The amplitude of the direct path signal is less than in FIG. 5C and several reflected signals are of significant amplitude. (Note that the scale has been increased to normalize the plot.) FIG. 5E approximates the response in a severe multipath environment such as: propagation through many rooms; from corner to corner in a building; within a metal cargo hold of a ship; within a metal truck trailer; or within an intermodal shipping container. In this scenario, the main path signal is weaker than in FIG. 5D. (Note that the scale has been increased again to normalize the plot.) In this situation, the direct path signal power is small relative to the total signal power from the reflections.

An impulse radio receiver in accordance with the present invention can receive the signal and demodulate the information using either the direct path signal or any multipath signal peak having sufficient signal to noise ratio. Thus, the impulse radio receiver can select the strongest response from among the many arriving signals. In order for the signals to cancel and produce a null at a given location, dozens of reflections would have to be cancelled simultaneously and precisely while blocking the direct path—a highly unlikely scenario. This time separation of mulitipath signals together with time resolution and selection by the receiver permit a type of time diversity that virtually eliminates cancellation of the signal. In a multiple correlator rake receiver, performance is further improved by collecting the signal power from multiple signal peaks for additional signal to noise performance.

Where the system of FIG. 5A is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{1}{\sigma^2} \exp\left(\frac{-r^2}{2\sigma^2}\right)$$

where r is the envelope amplitude of the combined multipath signals, and $2\sigma^2$ is the RMS power of the combined mulitpath signals.

Figure 5F:
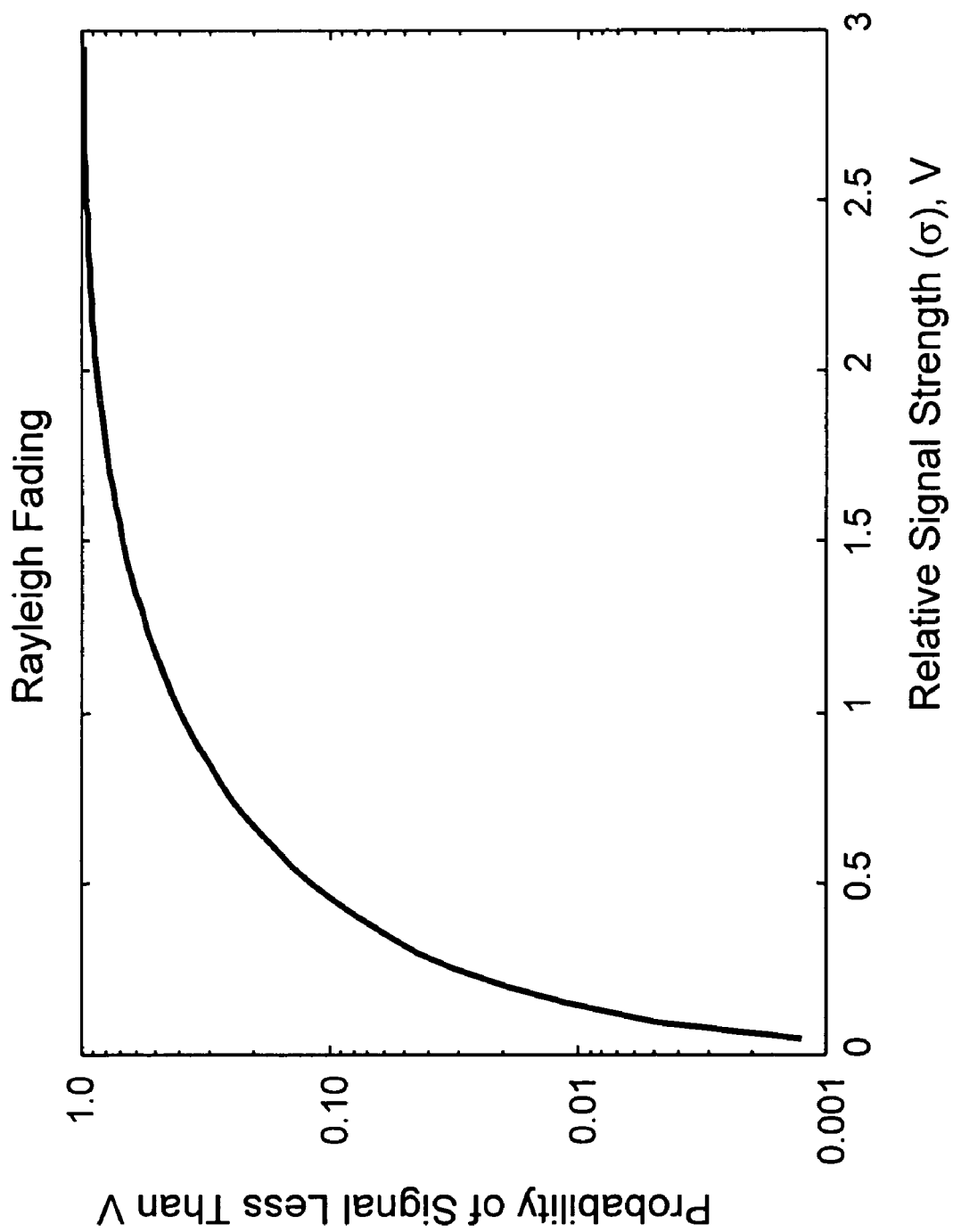
FIGS. 5F illustrates the Rayleigh fading curve associated with non-impulse radio transmissions in a multipath environment.

This distribution shown in FIG. 5F. It can be seen in FIG. 5F that 10% of the time, the signal is more than 16 dB attenuated. This suggests that 16 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

Figure 5G:
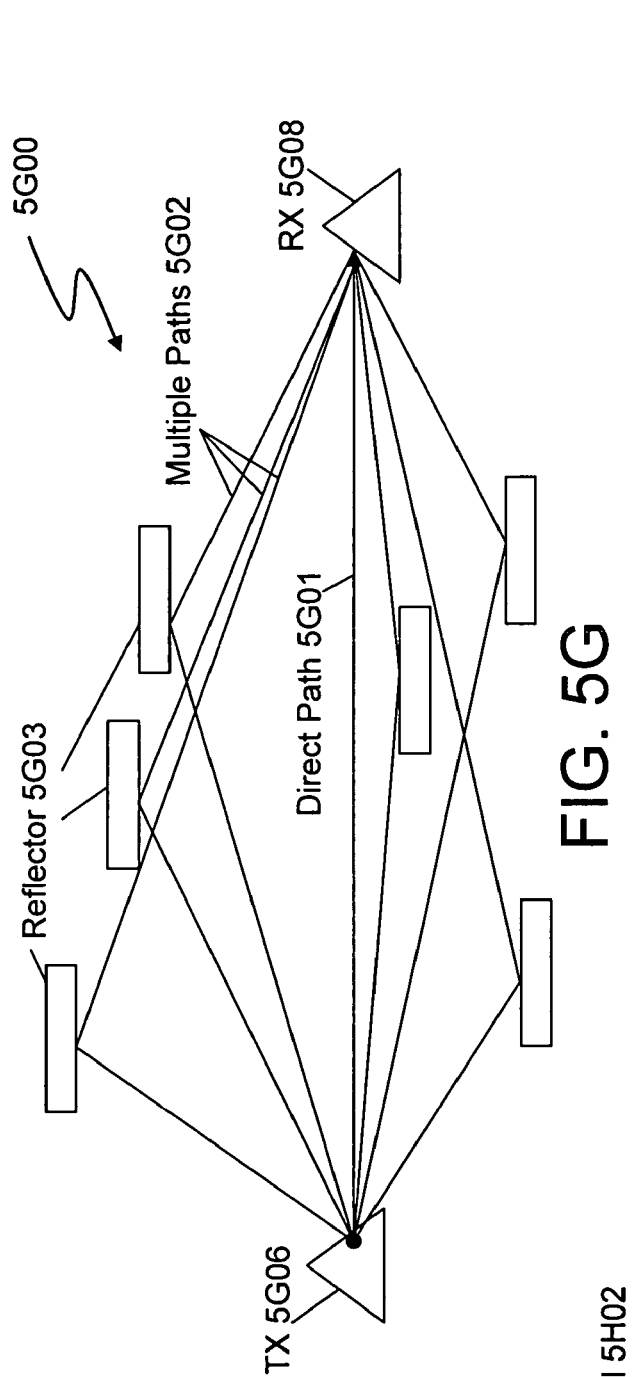
FIG. 5G illustrates a plurality of multipaths with a plurality of reflectors from a transmitter to a receiver.
Figure 5H:
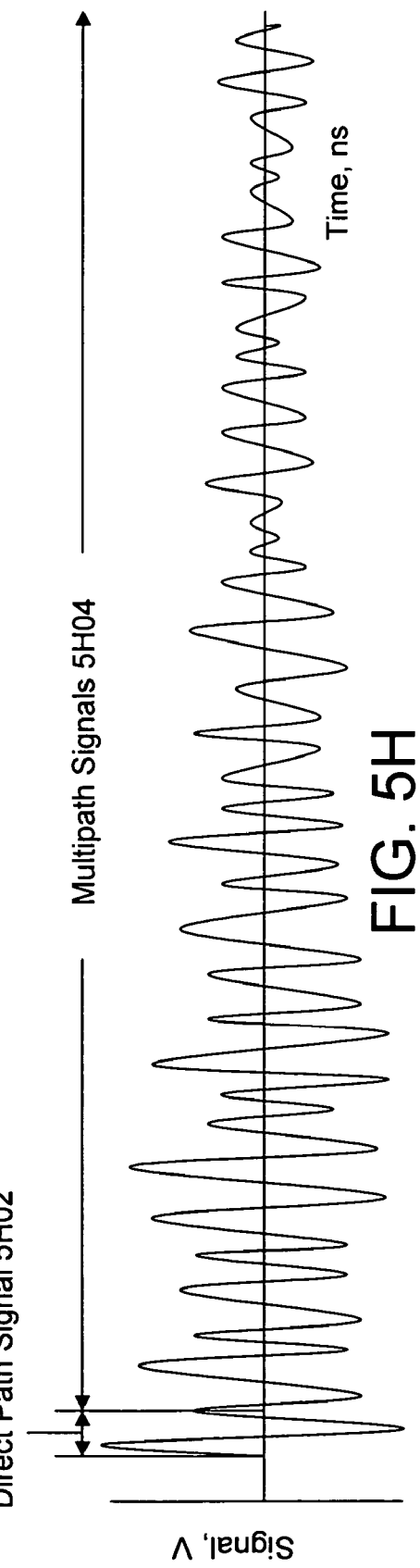
FIG. 5H graphically represents signal strength as volts vs. time in a direct path and multipath environment.

In a high multipath environment such as inside homes, offices, warehouses, automobiles, trailers, shipping containers, or outside in the urban canyon or other situations where the propagation is such that the received signal is primarily scattered energy, impulse radio, according to the present invention, can avoid the Rayleigh fading mechanism that limits performance of narrow band systems. This is illustrated in FIGS. 5G and 5H in a transmit and receive system in a high multipath environment 5G00, wherein the transmitter 5G06 transmits to receiver 5G08 with the signals reflecting off reflectors 5G03 which form multipaths 5G02. The direct path is illustrated as 5G01 with the signal graphically illustrated at 5H02, with the vertical axis being the signal strength in volts and horizontal axis representing time in nanoseconds. Multipath signals are graphically illustrated at 5H04.

Distance Measurement

Important for positioning, impulse systems can measure distances to extremely fine resolution because of the absence of ambiguous cycles in the waveform. Narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allows positive determination of the waveform position to less than a wavelength— potentially, down to the noise floor of the system. This time position measurement can be used to measure propagation delay to determine link distance, and once link distance is known, to transfer a time reference to an equivalently high degree of precision. The inventors of the present invention have built systems that have shown the potential for centimeter distance resolution, which is equivalent to about 30 ps of time transfer resolution. See, for example, commonly owned, co-pending applications Ser. No. 09/045,929, filed Mar. 23, 1998, titled "Ultrawide-Band Position Determination System and Method", and Ser. No. 09/083,993, filed May 26, 1998, titled "System and Method for Distance Measurement by Inphase and Quadrature Signals in a Radio System", both of which are incorporated herein by reference.

In addition to the methods articulated above, impulse radio technology along with Time Division Multiple Access algorithms and Time Domain packet radios can achieve geo-positioning capabilities in a radio network. This geo-positioning method allows ranging to occur within a network of radios without the necessity of a full duplex exchange among every pair of radios.

Figure 9A:
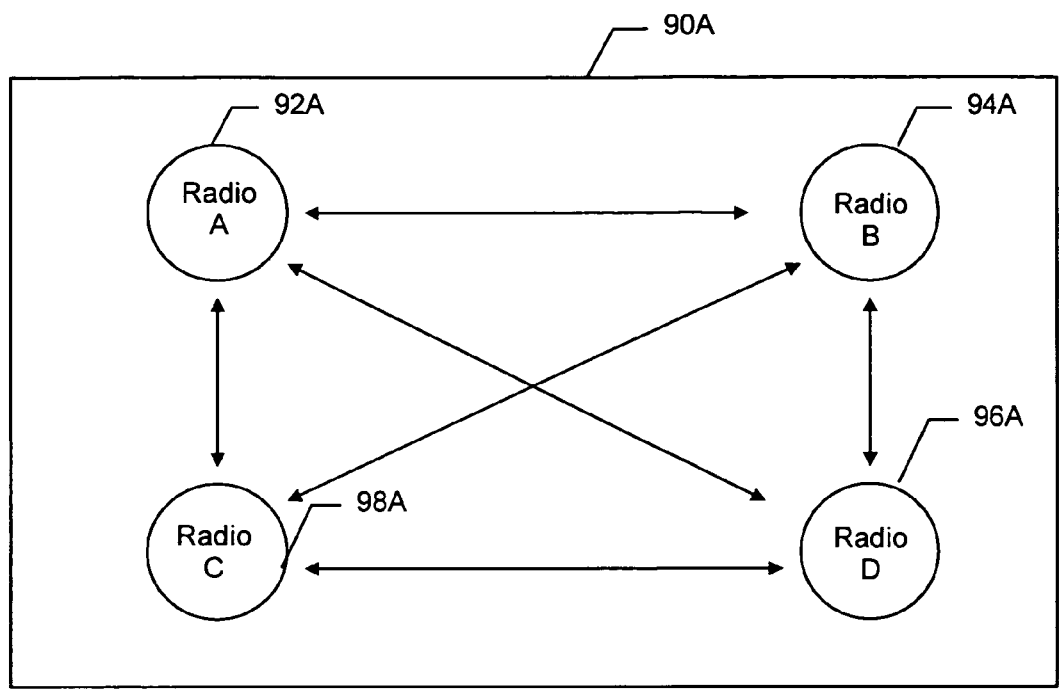
FIG. 9A illustrates four nodes in an Impulse Radio TDMA linked network and the known distances between each node.
Figure 9B:
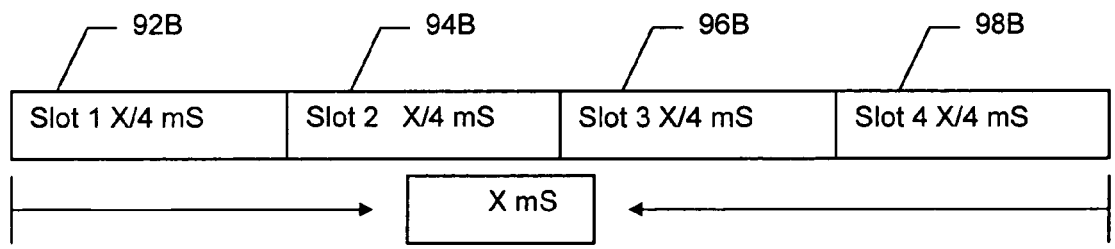
FIG. 9B illustrates the four time slots associated with a four node Impulse Radio TDMA network.

FIG. 9A illustrates an example of a four slot TDMA network 90A. We begin with all radios off the air. As the first radio, 92A, comes on, it pauses to listen to the current network traffic. After a reasonable delay, it powers on and, having heard no other traffic, takes control of the first slot shown in FIG. 9B as 92B. While online, it will periodically send a hello request containing identifying information showing it owns slot 1. Although the network is considered adhoc, the radio that owns the first TDMA slot has some unique responsibilities.

Radio B, 94A, powers up next and begins to listen to network traffic. It notes that Radio A, 92A, is on the air in the first slot. Radio B, 94A, acquires slot 2, 94B, and transmits a hello request at the slot two position 2, 94B. The hello request prompts an exchange with Radio A, 92A, as soon as his slot comes available. Radio A transmits a packet that will result in the acquisition of two pieces of information. Radio A, 92A, sends a SYNC packet containing a request for an immediate acknowledgement. Radio B, 94A, is thereby given permission to respond during Radio A's slot time. Radio B, 94A, transmits a SYNC ACK packet in return. Radio A, 92A, then calculates the distance to Radio B, 94A, and properly adjusts the synchronization clock for the distance and sends the current time, adjusted for distance, to Radio B, 94A. At this point Radio A's, 92A, clock is synchronized with Radio B, 94A. Once this occurs, any time Radio A, 92A, transmits, Radio B, 94A, is capable of calculating the distance to Radio A, 92A, without a full duplex exchange. Also any time Radio B, 94A, transmits, Radio A, 94A, is capable of calculating the distance to Radio B, 94A.

Through periodic SYNC packets to radio C, 98A, and radio D, 96A, on the network, clock synchronization could be maintained throughout the entire network of radios. Assuming that radio A, 92A, radio B, 94A, radio C, 98A and radio D, 96A, always transmit packets at the immediate start of their slot times 92B, 94B, 96B, and 98B, this system would allow all radios on a network to immediately calculate the distance to any other radio on the network whenever a radio transmitted a packet.

Exemplary Transceiver Implementation

Transmitter

An exemplary embodiment of an impulse radio transmitter 602 of an impulse radio communication system having one subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614 together with an internally generated subcarrier signal (which is optional) and an information signal 616 to generate a modulated, coded timing signal 618. The code source 612 comprises a storage device such as a random access memory (RAM), read only memory (ROM), or the like, for storing suitable PN codes and for outputting the PN codes as a code signal 614. Alternatively, maximum length shift registers or other computational means can be used to generate the PN codes.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger to generate output pulses. The output pulses are sent to a transmit antenna 624 via a transmission line 626 coupled thereto. The output pulses are converted into propagating electromagnetic pulses by the transmit antenna 624. In the present embodiment, the electromagnetic pulses are called the emitted signal, and propagate to an impulse radio receiver 702, such as shown in FIG. 7, through a propagation medium, such as air, in a radio frequency embodiment. In a preferred embodiment, the emitted signal is wide-band or ultrawide-band, approaching a monocycle pulse as in FIG. 1A. However, the emitted signal can be spectrally modified by filtering of the pulses. This bandpass filtering will cause each monocycle pulse to have more zero crossings (more cycles) in the time domain. In this case, the impulse radio receiver can use a similar waveform as the template signal in the cross correlator for efficient conversion.

Receiver

An exemplary embodiment of an impulse radio receiver (hereinafter called the receiver) for the impulse radio communication system is now described with reference to FIG. 7.

The receiver 702 comprises a receive antenna 704 for receiving a propagated impulse radio signal 706. A received signal 708 is input to a cross correlator or sampler 710 via a receiver transmission line, coupled to the receive antenna 704, and producing a baseband output 712.

The receiver 702 also includes a precision timing generator 714, which receives a periodic timing signal 716 from a receiver time base 718. This time base 718 is adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter to generate the propagated signal. Thus, the timing of the template pulse train matches the timing of the received signal pulse train, allowing the received signal 708 to be synchronously sampled in the correlator 710. The correlator 710 ideally comprises a multiplier followed by a short term integrator to sum the multiplier product over the pulse interval.

The output of the correlator 710 is coupled to a subcarrier demodulator 732, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator is then filtered or integrated in the pulse summation stage 734. A digital system embodiment is shown in FIG. 7. In this digital system, a sample and hold 736 samples the output 735 of the pulse summation stage 734 synchronously with the completion of the summation of a digital bit or symbol. The output of sample and hold 736 is then compared with a nominal zero (or reference) signal output in a detector stage 738 to determine an output signal 739 representing the digital state of the output voltage of sample and hold 736.

The baseband signal 712 is also input to a lowpass filter 742 (also referred to as lock loop filter 742). A control loop comprising the lowpass filter 742, time base 718, precision timing generator 714, template generator 728, and correlator 710 is used to generate an error signal 744. The error signal 744 provides adjustments to the adjustable time base 718 to time position the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

FIGS. 8–8C illustrate the cross correlation process and the correlation function. FIG. 8A shows the waveform of a template signal. FIG. 8B shows the waveform of a received impulse radio signal at a set of several possible time offsets. FIG. 8C represents the output of the correlator (multiplier and short time integrator) for each of the time offsets of FIG. 8B. Thus, this graph does not show a waveform that is a function of time, but rather a function of time-offset. For any given pulse received, there is only one corresponding point which is applicable on this graph. This is the point corresponding to the time offset of the template signal used to receive that pulse. Further examples and details of precision timing can be found described in U.S. Pat. No. 5,677,927, and commonly owned co-pending application Ser. No. 09/146,524, filed Sep. 3, 1998, titled "Precision Timing Generator System and Method", both of which are incorporated herein by reference.

IMPULSE RADIO AS USED IN THE PRESENT INVENTION

Utilizing the unique properties of impulse radio, the current state of the art in positioning and function control based on precise positioning systems is dramatically improved. By using the positioning techniques in the prior impulse radio positioning patents that have been incorporated herein by reference, and integrating them into functional systems, a system and method for information assimilation and functionality control based on positioning information obtained by impulse radio means is herein enabled.

Figure 10:
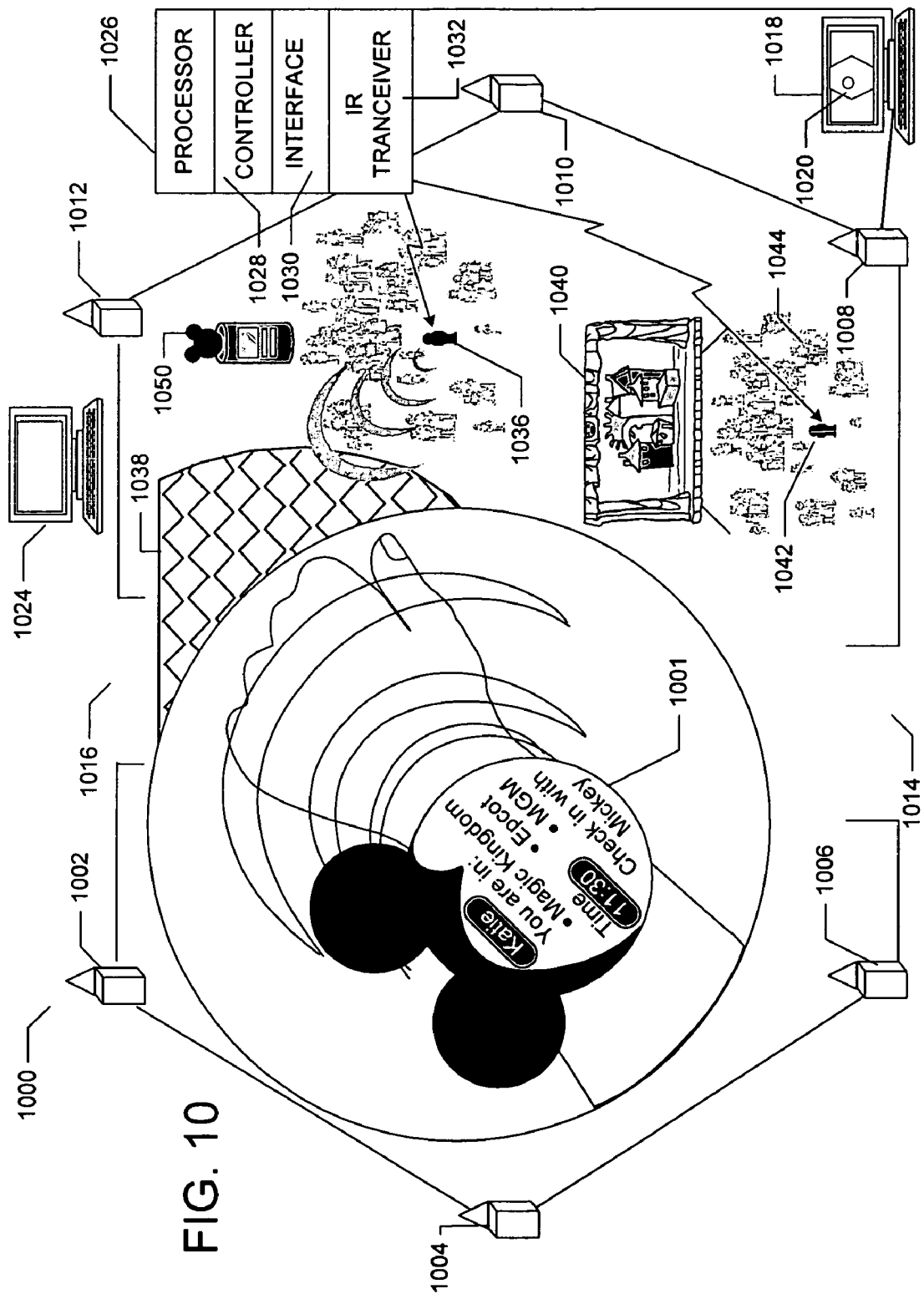
FIG. 10 illustrates a theme park embodiment of the present invention wherein information assimilation and position based functionality is incorporated.

FIG. 10, 1000, illustrates one preferred embodiment of the present invention wherein a plurality of fixed impulse radio transceivers 1002–1012 define a predetermined area of coverage. This predetermined area can be defined by an area such as a theme park, mall, airport parking lot, airport, restaurant, office building, tradeshow conference area or any area wherein boundaries can be defined. Although uniform positioning is depicted, the spacing and positioning of the impulse radio transceivers will be placed based on the parameters determined by the users. If there is desired that a large data communication rate be established with minimal errors, each individual impulse radio transceiver can be placed in a more near proximity to each other. Further, if a large multipath problem exits, such as may be the case with many trees, metal buildings and the like or if a cluttered electromagnetic environment exists, more impulse radio transceivers may be required to cover a given predetermined area.

Thus, when establishing the predetermined area that is to be covered, testing should take place to determine the optimum spacing and positioning of all impulse radios. In addition, communication can be maintained between each reference impulse radio transceiver via wireless impulse radio means, via wired or fiber optic means, via standard RF links or any communication means.

Upon designation of a predetermined coverage area and placement of impulse radios, entrance points 1016, 1014 can be designated. The purpose of the entry points is to enable the gathering of information and dissemination of impulse radio "TAGS" (e.g., see wrist TAG 1001) and to begin tracking. TAGS as used herein and as described in the patents incorporated herein by reference refers to impulse radio transceivers, transmitters or receivers depending on which positioning architecture is being employed. Positioning architectures and the multitude of embodiments using either transceivers, transmitters, receivers or mixed to determine position are fully described in patent application Ser. No. 09/456,409, filed Dec. 8, 1999, entitled, "System and Method for Person or Object Position Location Utilizing Impulse Radio." Also, distance measuring and position location using impulse radio using a plurality of distance architectures is enabled in co-pending and commonly owned application Ser. No. 09/456,410, filed Dec. 8, 1999, titled, "System and Method for Monitoring Assets, Objects, People and Animals Utilizing Impulse Radio," and it's parent Ser. No. 09/407,106, filed Sep. 27, 1999, all of which are incorporated herein by reference.

Upon entry into the predetermined area, information is gathered from the entrant (entrant can include not only a person, but any object, animal or thing). This information can be input and stored into a computer as depicted at 1018 and 1024 via a keyboard 1022. Computer 1018 and keyboard 1022 can comprise any known computing device, such as handheld computer terminals used by rental car or delivery personnel, that permits data entry and collection. Once the information is obtained concerning the entrant, a tag is correlated to the entrant in computer 1018 or 1024. The impulse radio TAGS will have a serial number and unique identifier to enable differentiation of all TAGS in the predetermined area and correlation of that particular TAG to that particular entrant with the ascertained information. Although, in this embodiment the TAG is given to the entrant at an entry point to the predetermined area, alternate methodologies can be employed to gather information about a potential entrant for correlation to a given TAG. For example, a questionnaire can be mailed out and returned by a potential entrant, thereafter the information is correlated to a TAG which is then mailed back to the future entrant. Activation of the TAG can then be manual by the entrant as they enter the predetermined area, by automatic activation means such as RF, infra red, optical or scanning means; all of which can be employed by those of ordinary skill in the art of remote switching and activation without undue experimentation. In addition to the mailed questionnaire, information can be input over the Internet and correlated to an entrant TAG for pickup at the predetermined area or again mailed to the future entrant. In this preferred embodiment depicted in FIG. 10, the TAG is activated by a person stationed at the entrance to the predetermined area, after they have obtained information concerning the entrant and correlated it to the TAG and before the entrant enters the predetermined area. The location of an entrant is illustrated on the display of computer 1018 at a location 1020 within the predetermined area defined by impulse radio transceivers 1002–1012, which is also illustrated on the display of computer 1018.

As the entrant enters the predetermined area, their position is monitored using impulse radio means as described in the patents incorporated herein by reference. In one embodiment, position monitoring can be done on a substantially constant basis if necessary. Alternatively, position monitoring can be done periodically, either automatically by computer control or manually initiated. This position information is passed to computer 1018 via impulse radio transceiver 1008. Computer 1018 is networked with controller 1028. Included with controller 1028 is processor 1026, interface 1030 and impulse radio (IR) transceiver (or transmitter) 1032. Controller 1028 is interfaced via interface 1030 with whatever system that is desired to control within the predetermined area. For example, it may be desired to simply transmit the position information of the entrant to the entrant via impulse radio transceiver 1032. However, it might also be desired to transmit the position of entrant 1036 (located adjacent a particular entertainment attraction area 1038), to entrants parents. Or it may be desired, to contact the entrant via wrist TAG 1001 and tell them, if they are a child (age information will be obtained during the information gathering step) that they are entering an adult area only; or if the position of the child entrant is outside of a given radius from their parent.

Controller 1028 can also be interfaced via impulse radio (IR) interface 1032 with a display 1040. When entrant comes within a given distance (as determined by processor 1026) of display 1040, a narrative of the display can occur in the language of the entrant in a headphone issued to the entrant. For example, entrant who is a French woman, 1042, can come within five yards of an animated character display 1040 and a French narrative of the display 1040 will be passed via impulse radio transceiver 1032 with an impulse radio receiver in the headset (not shown) used by entrant. The headset will contain the same unique identifier as the TAG, so it can be correlated with the entrants information and the TAG position information. The information concerning the language of the entrant being French can be obtained during the information gathering step and the instruction to play the narrative in French occurs in the processor which is in communication with the interface which is interfaced with the various functionalities (such as the narrative of all displays) that occur in the predetermined area. It is because of the unique properties of impulse radio that allows a large number of simultaneous transmissions (which may be required if a large crowd, 1044, require simultaneous distinct transmissions) in a confined area without interference problems.

Parents, entrants, or park personnel can input or receive location information, and the like, about others with TAGs via an information center 1050. The information center 1050 can be coupled to processor 1026 by impulse radio techniques or conventional communications techniques.

Figure 11:
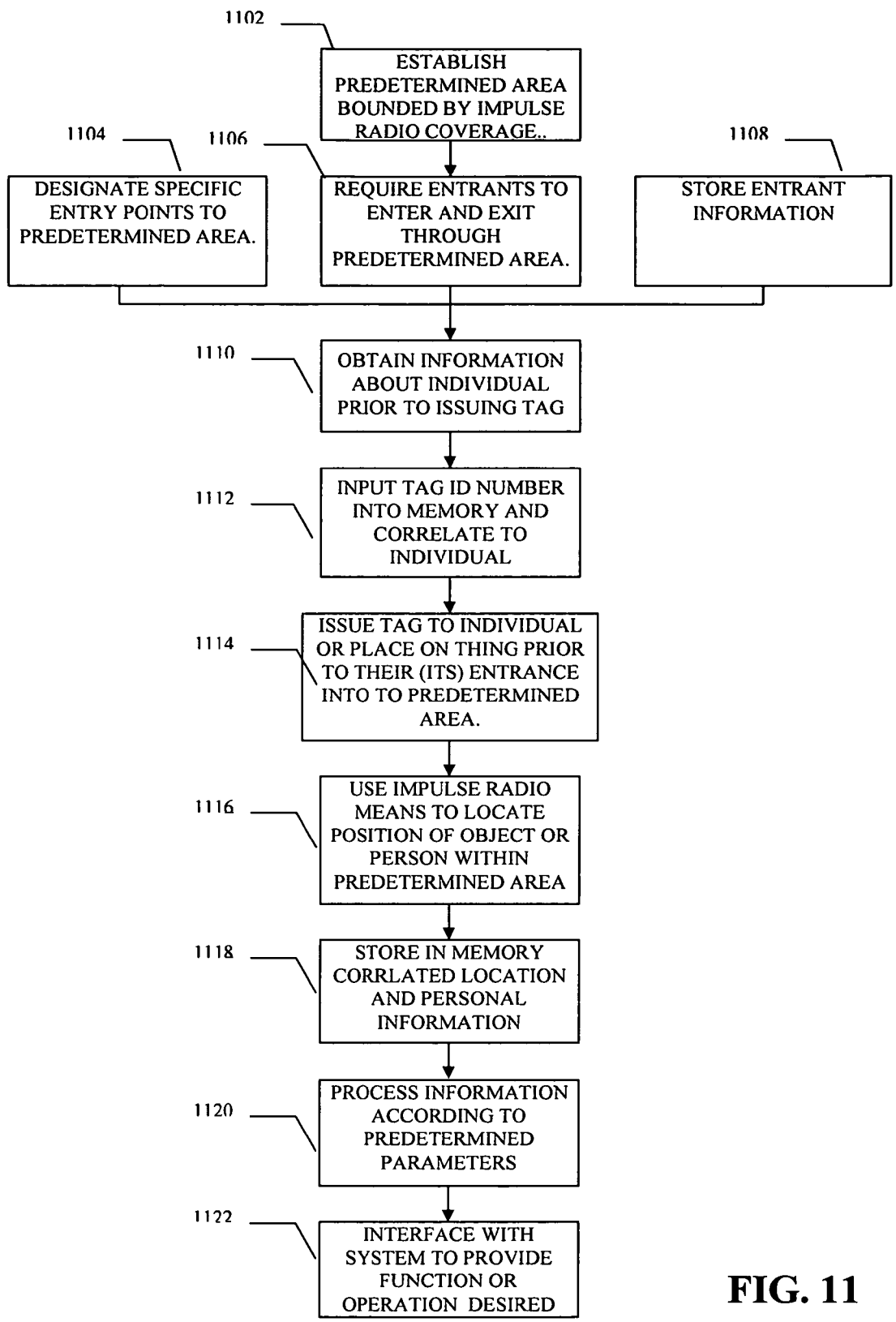
FIG. 11 is a flow chart of the position based function controller aspect of the present invention.

FIG. 11 illustrates the process of obtaining information about a person or object entering a predetermined area, monitoring their position utilizing impulse radio means and acting on that information in some manner. In step 1102 a predetermined area is established which is bounded by impulse radio coverage. As mentioned above, this area can coincide with an area such as a theme park, shopping mall, office building, restaurant, residence parking garage or the like. In step 1104 specific entry points are established to the predetermined area and in step 1106 entrants are required to enter and exit through those entry points. This can be the standard entrance to the mall or theme park or similar area. This step can be obviated if information about the person or object is gathered and correlated to the TAG prior to arrival to the predetermined area. Then, upon arrival to the predetermined area, the TAG can be activated by any of the means discussed above. Whether the information is gathered at the predetermined area or via other means such as via mail or the Internet, the information must be stored as illustrated at a step 1108.

Assuming that there is not information about the object or person prior to arrival at the predetermined area, in step 1110 information is gathered about the person or object prior the issuance of a TAG. If the information is gathered by a employee of the pre-designated area, such as an employee at a theme park, the employee will input the TAG identification number and correlate it to the person whose information is being taken in step 1112. Upon completion of data entry and TAG correlation, the TAG is activated and placed with the person or object 1114, prior to their (its) entrance into the predetermined area. Once the TAG is activated and the person or object has entered the predetermined area, in step 1116 impulse radio means are used to locate the position of and track the object or person within the predetermined area. In step 1118, the correlated location and personal information is stored in a memory means.

In step 1120 this information is processed according to predetermined parameters. These parameters can be a proximity to a given display, or a child under a certain age getting within a certain distance to a pond or other water hazard, or it could be a relative distance between two persons (such as a parent and a child), or a relative distance between an object and a person (such as a person with a valuable object such as a briefcase), or any parameters that could use the utilize the functionality herein described. In step 1122 an action is taken based on the parameters that have been processed. This action occurs via an interface between a controller and a device that is to be controlled. For example, a sight seeing train may be interfaced with said controller. If the parameters are such that if an object or person is positioned on the track and within 100 yards of the train, the controller can communicate with an alerting means to warn the sight seeing train of the danger or it can automatically signal the TAG and alert the person or person associated with an object of the potential danger.

A parameter could be that a TAG must be within a certain distance of a display in order for the display to provide a narrative. This would provide that a narrative of the display would only be playing while someone is there to watch and listen. Another example of a parameter is if the position of the person or object places them in an "employees only" area. The controller could be interfaced with a communication means that alerts the TAG and therefore the person or object associated with the TAG that they are in an employees only area; or the communication can be with the area security to alert them of the unauthorized entry. This list is for illustrative purposes only, and it is anticipated that any number of activities can be accomplished by knowing information about a person or object, correlating that to the position of the person or object in a predetermined area and interfacing a controller that processes parameters desired in order to control activities and functionalities based on the parameters and the position of the person or object information.

Figure 12:
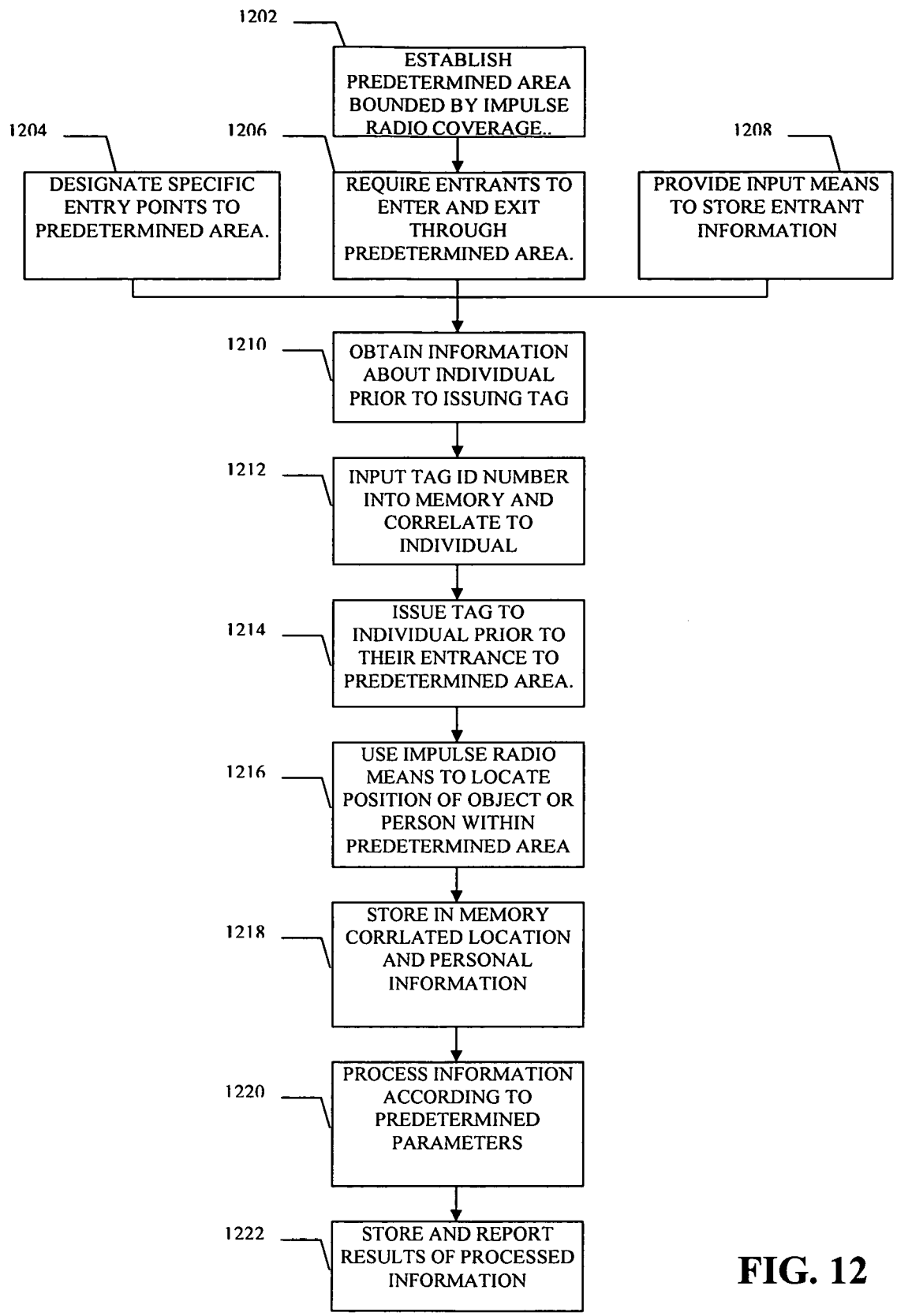
FIG. 12 is flow chart of the information assimilation embodiment of the present invention.

FIG. 12 illustrates the information assimilation aspect of the present invention. The steps 1202–1220 of FIG. 12 are the same as steps 1102–1120 of FIG. 11. FIG. 12, however, replaces the step 1122 of FIG. 11 which requires an interface with a system to provide function or operation desired with step 1222 which is to store and report the results of the processed information. The goal of this embodiment is not to use the position information to effectuate a control system based on position information determined by impulse radio means, but rather to organize and correlate information about the person or object who is being tracked with the position information which indicates areas within the predetermined area that the person or object has been. Thus, it will be possible to correlate information according to any parameters desired. For example, for marketing purposes it can be determined what the demographic profile of all people that attend a particular animal exhibit or production is and tailor the advertising plan to that particular demographic profile. Mall managers can provide information to their tenants about which ages and which gender of people are soliciting their stores. The stores can then stock merchandise accordingly. It is easy to see the myriad possibilities from an informational perspective that can be achieved.

While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements which embody the spirit and scope of the present invention.

What is claimed is:

1. A system of correlating information related to an entrant within a predetermined area defined by a plurality of fixed ultra wideband impulse radios, comprising:
   an ultra wideband impulse radio device; and
   an interface with a controller, said controller obtaining said information relating to the entrant within said predetermined area and correlating said information about the entrant to at least one position of the entrant determined using ultra wideband impulse radio position determination techniques.

2. The system of claim 1, further comprising:
   an interface with a communicating device, said communicating device providing a warning based upon said correlated information and predetermined parameters.

3. The system of claim 1, wherein correlating comprises associating an ultra wideband impulse radio device with the entrant, wherein said position of the entrant is determined using said information about the entrant and a position of the ultra wideband impulse radio device determined by ultra wideband impulse radio position determination techniques.

4. The system of claim 1, wherein said plurality of fixed ultra wideband impulse radios use Time Division Multiple Access (TDMA) techniques for communicating with each other.

5. The system of claim 1, wherein said ultra wideband impulse radio position determination techniques comprise synchronous ultra wideband impulse radio position determination techniques.

6. The system of claim 1, wherein said predetermined area comprises one of:
   a theme park;
   a shopping mall;
   an office building;
   a prison;
   a parking garage,
   a convention center;
   a restaurant;
   a zoo; and
   a museum.

7. The system of claim 1, further comprising:
   an interface to at least one output device, said at least one output device conveying at least one of said obtained information, said correlated information, and said at least one position of the entrant.

8. The system of claim 7, wherein said at least one output device comprises at least one of a visual display device and an audio device.

9. The system of claim 1, wherein said at least one position of the entrant indicates movement of the entrant.

10. The system of claim 1, wherein said controller automatically obtains said information relating to the entrant within said predetermined area based upon the at least one position of the entrant.

11. The system of claim 1, wherein said information is determined prior to said entrant entering said predetermined area.

12. The system of claim 1, further comprising:
   an interface to a device that is to be controlled, said device being controlled based upon said correlated information about the entrant and said at least one position of the entrant.

13. The system of claim 1, wherein said controller is a microprocessor.

14. A method of controlling functions, comprising the steps of:

> determining position information using ultra wideband impulse radio position determination techniques; and
>
> controlling a function based upon said position information, a predetermined area defined by a plurality of fixed ultra wideband impulse radios, and at least one predetermined position parameter.

15. The method of claim 14, wherein said controlling a function comprises activating an alarm when an entrant is at a particular position within a predetermined area.

16. The method of claim 14, wherein said plurality of fixed ultra wideband impulse radios use TDMA techniques for communicating with each other.

17. The method of claim 14, wherein said controlling a function comprises activating a device.

18. The method of claim 14, wherein said ultra wideband impulse radio position determination techniques comprise synchronous ultra wideband impulse radio position determination techniques.

19. The method of claim 14, wherein said ultra wideband impulse radio position determination techniques comprise asynchronous ultra wideband impulse radio position determination techniques.

20. A method of controlling a function, comprising:

> determining a position of an ultra wideband impulse radio using a plurality of fixed ultra wideband impulse radios corresponding to a predetermined area defined using said plurality of fixed ultra wideband impulse radios, said position being determined using ultra wideband impulse radio position determination techniques; and
>
> controlling said function based upon said determined position relative to said predetermined area.

* * * * *